United States Patent
Chin et al.

(10) Patent No.: US 9,651,418 B2
(45) Date of Patent: May 16, 2017

(54) FIBER SENSING SYSTEM BASED ON A BRAGG GRATING AND OPTICAL TIME DOMAIN REFLECTOMETRY

(71) Applicant: ECOLE POLYTECHNIQUE FEDERALE DE LAUSANNE (EPFL), Lausanne (CH)

(72) Inventors: Sang Hoon Chin, Ecublens (CH); Luc Thévenaz, Grandevent (CH)

(73) Assignee: Ecole Polytechnique Fédérale de Lausanne (EPFL), Lausanne (CH)

( * ) Notice: Subject to any disclaimer, the term of this patent is extended or adjusted under 35 U.S.C. 154(b) by 0 days.

(21) Appl. No.: 14/367,129

(22) PCT Filed: Dec. 19, 2012

(86) PCT No.: PCT/IB2012/057463
§ 371 (c)(1),
(2) Date: Jun. 19, 2014

(87) PCT Pub. No.: WO2013/093788
PCT Pub. Date: Jun. 27, 2013

(65) Prior Publication Data
US 2014/0375980 A1 Dec. 25, 2014

(30) Foreign Application Priority Data
Dec. 20, 2011 (WO) .................. PCT/IB2011/055812

(51) Int. Cl.
| | | |
|---|---|---|
| *G11B 11/16* | (2006.01) |
| *G01J 1/04* | (2006.01) |
| *G01D 5/353* | (2006.01) |
| *G01K 11/32* | (2006.01) |
| *G01L 1/24* | (2006.01) |
| *G01M 11/00* | (2006.01) |
| *G02B 6/34* | (2006.01) |

(52) U.S. Cl.
CPC ........ *G01J 1/0425* (2013.01); *G01D 5/35316* (2013.01); *G01K 11/32* (2013.01); *G01L 1/246* (2013.01); *G01M 11/3109* (2013.01); *G02B 6/34* (2013.01)

(58) Field of Classification Search
CPC .................................................... G01B 11/16
USPC ........................................................ 356/32
See application file for complete search history.

(56) References Cited

U.S. PATENT DOCUMENTS

| | | | |
|---|---|---|---|
| 4,761,073 A | 8/1988 | Meltz et al. | |
| 5,380,995 A * | 1/1995 | Udd .................. | G01D 5/35303 250/227.18 |
| 5,627,927 A * | 5/1997 | Udd .................. | G01D 5/35312 385/24 |
| 5,684,297 A | 11/1997 | Tardy | |

(Continued)

OTHER PUBLICATIONS

International Search Report for PCT/IB2012/057463 mailed Jun. 11, 2013.

(Continued)

*Primary Examiner* — Roy M Punnoose
(74) *Attorney, Agent, or Firm* — Nixon & Vanderhye P.C.

(57) ABSTRACT

Optic fiber sensor characterized in that the sensing fiber is provided with a continuous Bragg grating covering the entire fiber length which is dedicated to sensing and along which spatially resolved measurements are performed.

7 Claims, 4 Drawing Sheets

(56) References Cited

U.S. PATENT DOCUMENTS

| | | | | |
|---|---|---|---|---|
| 5,717,804 A * | 2/1998 | Pan | ........................ | G02B 6/2552 385/37 |
| 5,748,312 A * | 5/1998 | Kersey | .................... | G01L 1/246 250/227.23 |
| 5,828,059 A * | 10/1998 | Udd | ........................ | G01L 1/246 250/227.18 |
| 6,009,222 A * | 12/1999 | Dong | ..................... | G02B 6/021 385/127 |
| 6,195,162 B1 * | 2/2001 | Varnham | ................ | G01H 9/004 250/227.19 |
| 6,335,524 B1 * | 1/2002 | Udd | ................... | G01D 5/35383 250/227.14 |
| 6,427,040 B1 * | 7/2002 | Ahuja | ................. | G02B 6/02123 385/10 |
| 6,529,658 B1 * | 3/2003 | Park | ................... | G02B 6/02142 359/558 |
| 6,795,599 B2 | 9/2004 | Spirin | ................ | G01D 5/35303 385/12 |
| 6,876,786 B2 | 4/2005 | Chliaguine | ........ | G01D 5/35303 250/227.11 |
| 7,190,705 B2 * | 3/2007 | Fermann | ............. | H01S 3/06754 372/18 |
| 8,027,557 B2 * | 9/2011 | Frith | ........................ | G02B 6/14 385/124 |
| 8,208,196 B2 * | 6/2012 | Fermann | ............. | H01S 3/06754 359/326 |
| 8,760,663 B2 * | 6/2014 | Tearney | ................ | A61B 5/0062 356/479 |
| 2001/0031108 A1 * | 10/2001 | Walter | ................... | G01B 11/18 385/13 |
| 2003/0127587 A1 * | 7/2003 | Udd | ....................... | G01L 1/246 250/227.14 |
| 2008/0204706 A1 * | 8/2008 | Magne | ................. | G01M 5/0025 356/32 |
| 2008/0285909 A1 * | 11/2008 | Younge | ................ | A61B 5/1076 385/13 |
| 2009/0180499 A1 * | 7/2009 | Wiedmann | ............ | G02F 1/3501 372/21 |

OTHER PUBLICATIONS

Written Opinion of the International Searching Authority mailed Jun. 11, 2013.
The First Office Action dated Sep. 6, 2015, issued in Chinese Patent Application No. 2012800632871, and English translation.
The Second Office Action dated Apr. 15, 2016, issued in Chinese Patent Application No. 2012800632871 and English translation.

* cited by examiner

FIBER SENSING SYSTEM BASED ON A BRAGG GRATING AND OPTICAL TIME DOMAIN REFLECTOMETRY

This application is the U.S. national phase of International Application No. PCT/IB2012/057463 filed 19 Dec. 2012 which designated the U.S. and claims priority to International Application No. PCT/IB2011/055812 filed 20 Dec. 2011, the entire contents of each of which are hereby incorporated by reference.

TECHNICAL FIELD

The present invention relates to optical fiber sensors and a sensing method comprising the use of such fiber sensors.

BACKGROUND ART

Sensing fibers may be used in different applications, for instance to control the functionality of fiber optic networks or to be installed like a sensing nerve system in a structure. These sensing fibers are primarily used for testing and can perform a similar function to a "strain gauge".

The sensor fiber represents the physical condition of the main optical fiber line and by testing the operational condition of the sensing fiber, the environment of the main line can be determined.

Glass fibers are sensitive to temperature or pressure and tensile forces, which locally change the characteristics of light transmission and reflections in the fiber. Such sensing properties of the glass fibers make it possible to also incorporate sensor fibers in a long distance tubing, such as a pipeline, in order to detect and localize a deformation or a change in temperature.

The standard method for measuring reflections from a pulsed probe signal is Optical Time Domain Reflectometry (OTDR) and uses a combination of optoelectronic testing instruments, such as a laser source and a pulse generator, to inject a series of optical pulses into the sensing fiber end.

The optical pulses travel through the optic fiber and are continuously reflected back to the same fiber end where the pulses were initially injected. Other optoelectronic testing instruments (detector combined with an oscillator) receive and interpret the return signal from the same fiber end by measuring the back-scattered light. The back scattered light contains a large quantity of different information based on reflections from reference points along the fiber. The strength of the return pulses is measured and interpreted as a function of time, and can be plotted as a function of fiber length.

Since the first demonstration of distributed fiber sensing using OTDR, based on Rayleigh scattering, a variety of distributed fiber sensing systems has been extensively developed over last two decades, using different physical phenomena such as Raman and Brillouin scattering. Most distributed sensing techniques rely on spontaneous light back-scattering while the light propagates through a sensing fiber installed along a structure under monitoring. However, the efficiency of spontaneous light scattering in any OTDR system based on Rayleigh, Raman and Brillouin scattering is insufficient to achieve a high spatial resolution over a long measurement range.

The process of light scattering can be significantly enhanced based on optical parametric interactions between two optical waves such as stimulated Brillouin scattering, designated as Brillouin optical time-domain analysis (BOTDA). This type of sensing system has shown its potentiality to interrogate distributed temperature and/or deformation of structures over 50 km with 2 m spatial resolution. In principle, the spatial resolution is determined by duration of the Brillouin pump pulse. So, a higher spatial resolution (shorter than 2 m) can be achieved simply by reducing the pump pulse duration. However, the sensing system will suffer from significant spectral broadening of the Brillouin resonance, which is inversely proportional to the pulse shortening. Consequently, it will degrade sensing performances of BOTDA system in terms of measurement accuracy, increasing standard deviation.

Recently, dynamic Brillouin grating (DBG)-based distributed sensing (DS) system using polarization maintaining fibers has been experimentally demonstrated, resulting in a best spatial resolution of 5 mm, ever reported in time domain sensing systems. Unlike the typical BOTDA system, two distinct physical processes: generation of Brillouin grating and interrogation of grating properties are entirely separated in this type of sensing system. This way the trade-off relation between high spatial resolution and high measurement accuracy could be no longer correlated. However, two actual limitations are apparently present in this type of sensing system. First, the states of polarization (SOP) of optical waves can be maintained during longitudinal propagation over less than 1 km, strictly limiting a maximal achievable measurement range. Second, from a practical point of view, the complexity of the sensing system may act as an actual limitation for its implementation in real applications.

In addition to the previous cited sensing systems another category of sensors has been developed, namely Fiber Bragg Grating (FBG) sensors.

"Bragg gratings" are reference points along the sensing fibers. They usually consist of laser engraved patterns which have been imprinted along the whole optic fiber length at specific and pre-defined distances.

Because of these Bragg gratings, an undamaged testing fiber generates a predetermined and specific return signal to the OTDR testing tool. If the optic fiber sensor is subject to mechanical strain (due to thermal expansion, damage, break, heat, pressure, magnetic or electric field etc.), the OTDR receives a modified return signal and can determine the location of the damaged point if a Bragg grating is coincidentally present at this point.

Such FBG sensors are disclosed in the following two patents: U.S. Pat. Nos. 4,996,419 5,684,297. The fibers show a plurality of separate Fiber Bragg Gratings distant from each other. Each FBG has a relatively short length. As pointed out in U.S. Pat. No. 5,684,297, the spectral width of a short-length FBG is so large, so a long frequency scan of probe pulse is required. Furthermore, the power dissipation of the pulse is also significant since the pulse spectrum is much shorter than the FBG reflection spectrum.

The state-of-the-art FBG sensors show several disadvantages. They often require a pre-calibration of the relation between FBG peak frequency shift and detected optical power difference. Furthermore, changes of temperature and strain are not uniform along the fiber, which makes the initial FBG spectrum (measured as a reference) distorted. It means that the pre-calibration would turn to be ambiguous, which will definitely degrade the measurement accuracy.

There is therefore a need to improve existing FBG sensors.

SUMMARY OF THE INVENTION

An objective of the present invention is to provide an improved Fiber Sensing System based on Bragg OTDR.

Another objective is to provide a higher efficiency of light back-scattering

Another objective is to eliminate the essential need of optical pump waves used to generate a dynamic acoustic grating in fibers.

In that regard the invention concerns an optical fiber as defined in the claims.

One of the essential features of the invention is the continuous, i.e. distributed, presence of a FBG covering the entire fiber length which is designated for sensing and along which spatially resolved measurements are preformed.

Preferably the fiber grating according to the invention has a low reflectivity. The overall integrated reflectivity along the entire FBG is preferably less than 20%.

A signal pulse launched into the sensing fiber according to the invention is continuously back-reflected by the FBG written along the fiber while propagating through the fiber. Then the central frequency of the signal pulse will be swept in the vicinity of the Bragg reflection spectrum (BRS). This way accurate information on local temperature or strain along the FBG can be interrogated since the central frequency of the local FBG has a linear dependence on changes of external temperature and/or strain applied to the FBG, showing a typical value of −1.4 GHz/K or 140 MHz/µε, respectively. Consequently, the measured peak frequency of BRS imposes information of local temperature/strain along the whole length of the sensing fiber.

One further advantage of the proposed invention is to provide an extremely high spatial resolution, readily reaching sub-cm. Due to the continuity of Bragg grating along the entire length of the sensing fiber, the distribution sensing can be realized with spatial resolution of a few millimeter, which makes the sensing system enable to monitor the structural heath of compact structures and/or integrated circuits.

Another advantage of the system according to the invention is to provide a simplified configuration since optical pump sources are no more required. A key to realize distributed sensing is based on the presence of the continuous back-scattering of the incident pulse, which propagates through a sensing fiber, which is secured along a structure under monitoring. After analyzing the optical properties of the back-scattered light the information about distortion along the structure such as a change in temperature and strain can be quantitatively determined. However, existing FBG-based sensing systems install a single or multiple individual FBGs along the structure under monitoring and launch an optical pulse that has time duration shorter than the interval between adjacent FBGs to interrogate the properties of local FBGs. It means that this type of sensing system cannot detect any changes in temperature and strain, which occur in regions where FBGs are absent, especially along the distance between two adjacent FBGs. The present invention can overcome this type of blind zone, simply by creating a weak FBG continuously along the entire sensing fiber. Therefore, the incident pulse provides a continuously back-scattered signal while propagating through the sensing fiber. So, this invention can make it possible to alarm a warning without blind zones when compared to the sensing systems disclosed in prior art.

The invention will be better understood below with a more detailed description, together with non-limiting examples.

DETAILED DESCRIPTION

Figure 1:
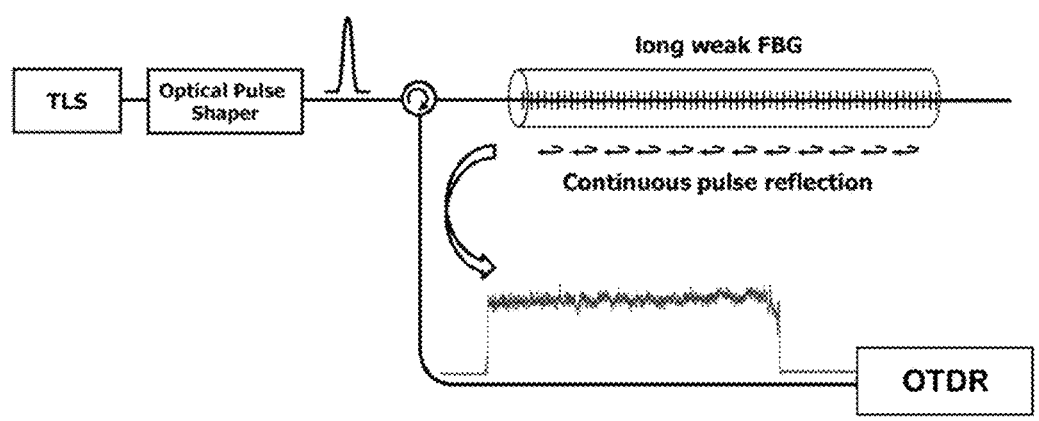
FIG. 1: Schematic diagram representing a preferred embodiment of the invention

Referring now to the drawings, FIG. 1 depicts a preferred schematic diagram of the proposed distributed sensing system to interrogate distributed temperature and/or strain along the fiber using a long and weak fiber Bragg grating.

A weak and long fiber Bragg grating is used as a sensing fiber and the temperature dependence of the peak frequency of the FBG is measured to be −1.23 GHz/K. A FWHM 50 ps signal pulse was generated after passing through a pulse shaping device that can be an electro-optic modulator (EOM) and then launched into the FBG. In turn, the central frequency of the pulse was incremented by steps of several MHz in the vicinity of the FBG reflection spectral window, simply by changing the frequency of the tunable laser source (TLS), and detected by the reflection measuring means, for example the Optical Time Domain Reflectometer (OTDR).

Figure 2A:
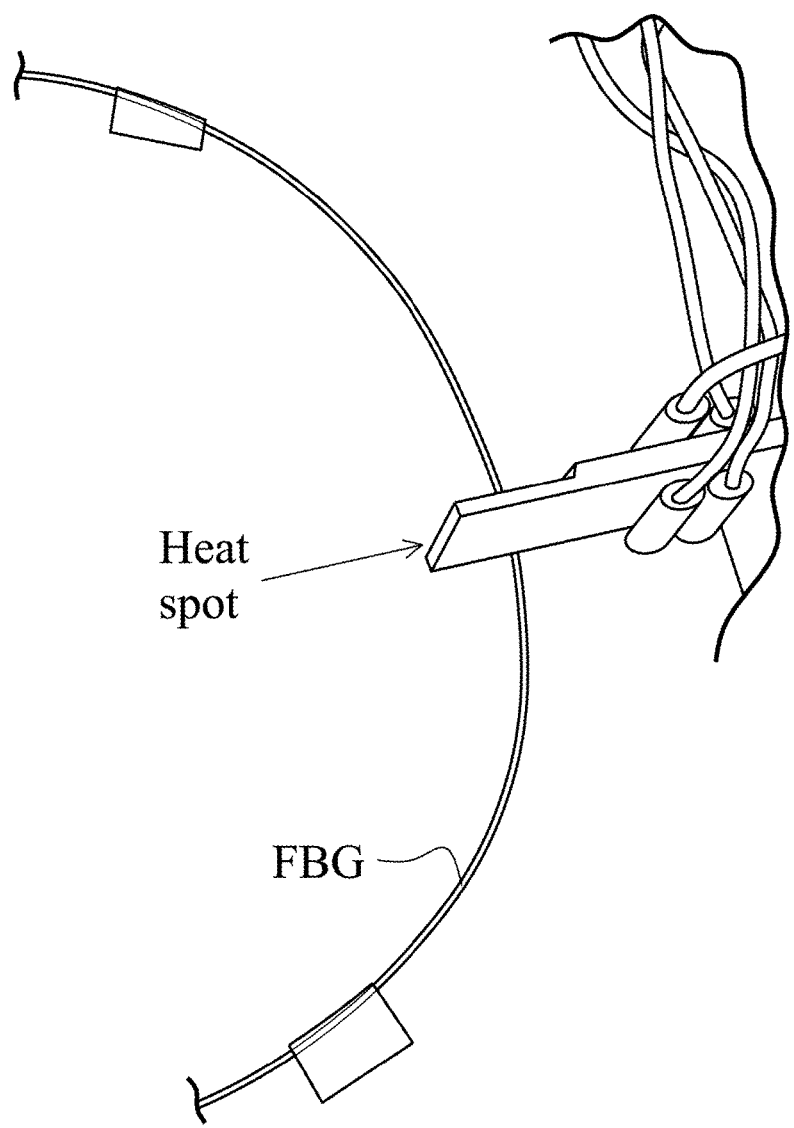
FIG. 2A: Photo of the optic fiber sensor

In FIG. 2(a) the FBG being used as a distributed sensor is shown. A hot spot is generated and can be precisely located using a distributed FBG according to the invention.

Figure 2B:
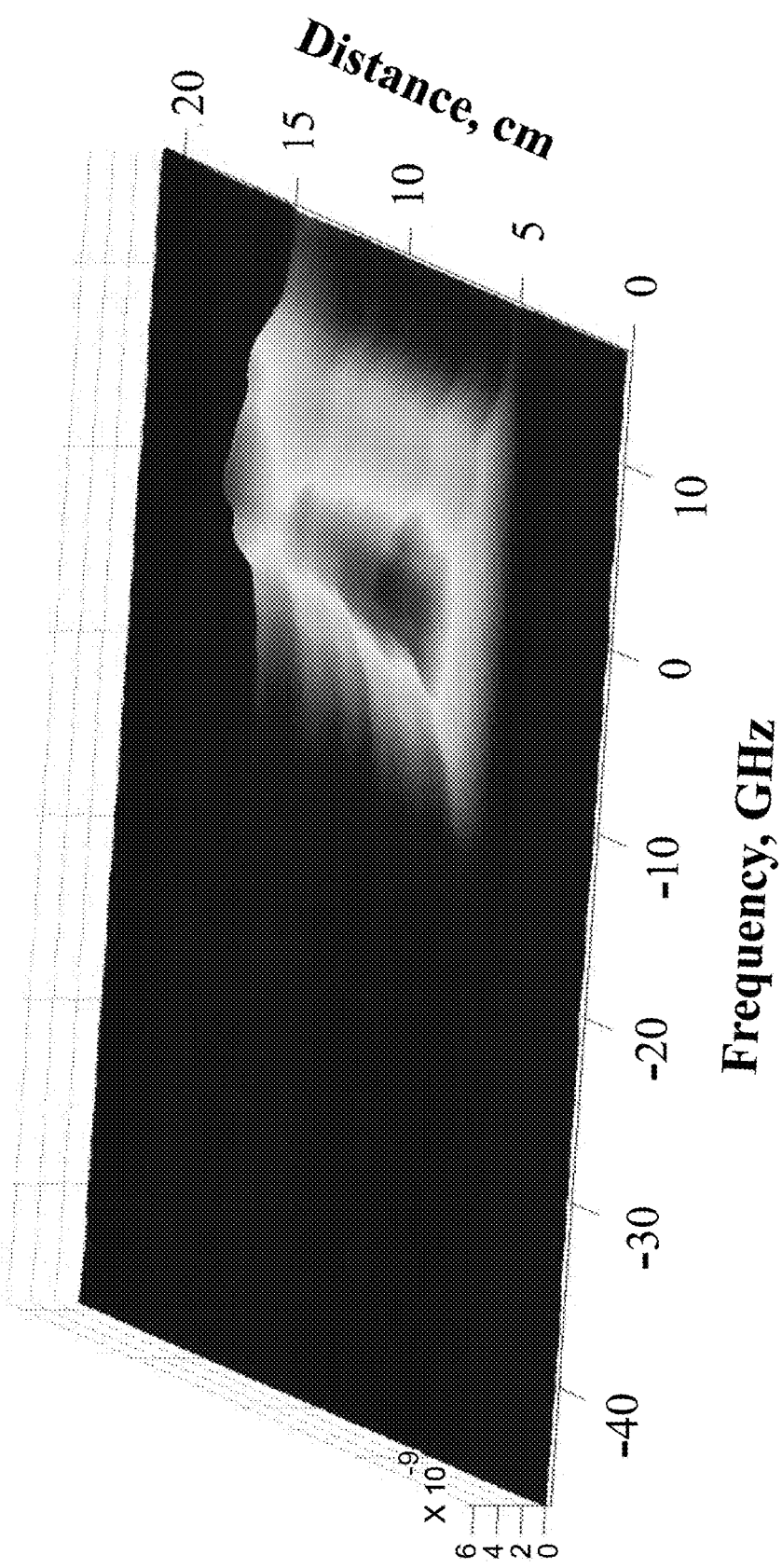
FIG. 2B: Photo of the measured reflection in absence of an external hot spot

FIG. 2(b) shows a measured distributed reflection spectrum of a FBG sensor according to the invention as a function of the fiber distance, in absence of any external hot spot and strain applied to the FBG sensor. The information delivered to the Optical Time-Domain Reflectometer (OTDR) corresponds to the return signal based on the original Bragg frequency shift. So, the measured distribution of FBG reflection spectrum is used as reference, so that any change in local Bragg frequency in consequent measurements can indicate qualitatively a change in temperature and strain at that position. However, it must be pointed out that FIG. 2(b) provides another important information about the uniformity of fabricated long FBG and frequency chirp information along the FBG based on the distribution of Bragg frequency in distance.

Figure 2C:
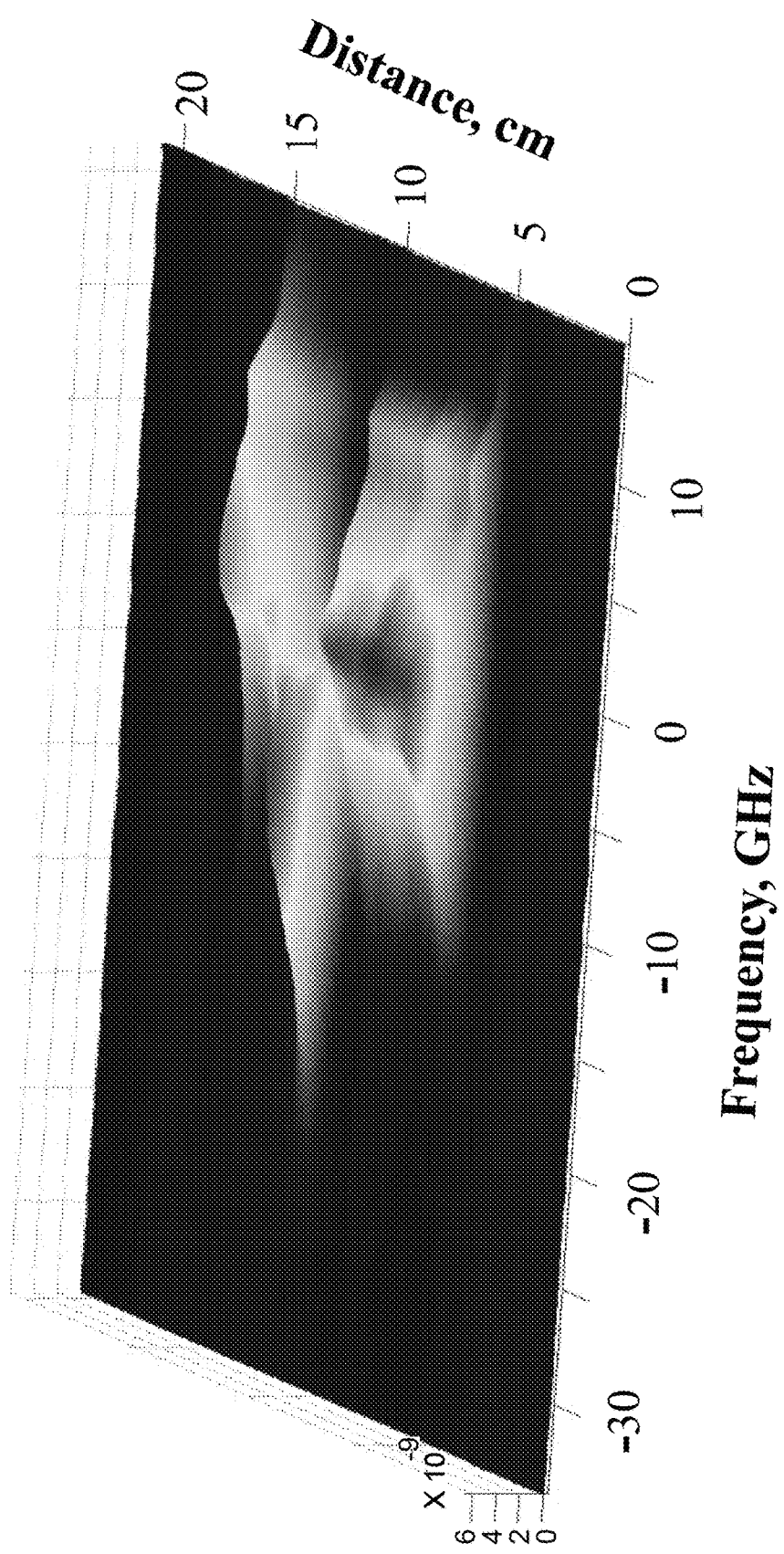
FIG. 2C Photo of the measured reflection in presence of an external hot spot

FIG. 2(c) shows a measured distributed reflection spectrum of a FBG sensor according to the invention as a function of the fiber distance in presence of an external hot spot (FIG. 2 c) along the long FBG. It is clearly observed that the presence of an hot spot leads to a measurable shift in the Bragg frequency. The amount of temperature change can be simply estimated as a result of the linear relationship of −1.23 GHz/K.

In this embodiment, the FBG was uniform, which means that the Bragg frequency over the whole length of the grating is nearly constant. However, it is not a necessary condition for this invention. For instance, the distribution of Bragg frequency along the grating can be linearly varied with respect to the distance or step-wised over the distance.

It must be also specified that an absolute continuity of the FBG along the covered sensing range is not strictly required and short segments of fiber without imprinted FBG may be present, since in most fabrication processes FBGs can be imprinted only along a finite length. It may therefore be required to append many gratings to extend the sensing length and a gap between gratings can be intentionally or accidentally be present. It is sufficient to require that this distance gap is smaller than the spatial resolution of the interrogating system to implement the invention. This case will be indistinctively identified as a continuous FBG in the description of this invention.

It is also not strictly required to shape the interrogating light signal as a single pulse, but other coding techniques can be implemented, such as multiple pulse coding or radio-frequency modulation scanning of the input light signal to retrieve the time-domain information via a Fourier transform.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

REFERENCES

[1] T. Horiguchi and M. Tateda, "Optical-fiber-attenuation investigation using stimulated Brillouin scattering between a pulse and a continuous wave," Opt. Lett. 14, 408-410 (1989).
[2] M. Ahangrani Farahani and T. Gogolla, "Spontaneous Rman scattering in optical fibers with modulated probe light for distributed temperature Raman remote sensing," J. Lightwave Technol. 17, 1379-1391 (1999).
[3] T. Horiguchi, T. Kurashima, and M. Tateda, "A technique to measure distributed strain in optical fibers," Photon. Technol. Lett. 2, 352-354 (1990).
[4] T. Kurashima, T. Horiguchi, and M. Tateda, "Distributed-temperature sensing using stimulated Brillouin scattering in optical silica fibers," Opt. Lett. 15, 1038-1040 (1990).
[5] K. Y. Song, S. Chin, N. Primerov and L. Thevenaz, "Time-domain distributed fiber sensor with 1 cm spatial resolution based on Brillouin dynamic grating," J. Lightwave Technol. 28, 2062-2067 (2010).
[6] M. durkin, M. Ibsen, M. J. Cole and R. I. Laming, "1 m long continuously-written fiber Bragg gratings for combined second and third order dispersion compensation," Electron. Lett. 33, 1891-1893 (1997).
[7] U.S. Pat. No. 4,996,419, "distributed multiplexed optical fiber bragg grating sensor arrangement," Filed Dec. 26, 1989.
[8] U.S. Pat. No. 5,684,297, "Method of detecting and/or measuring physical magnitudes using a distributed sensor," Nov. 15, 1995.

The invention claimed is:

1. An optical fiber sensor comprising
   a sensing fiber provided with a single and continuous Bragg grating covering an entire length of the sensing fiber;
   a tunable laser source;
   an optical pulse shaper receiving a signal from the tunable laser source and launching a shaped pulse signal into one end of the sensing fiber; and
   reflection measuring means in connection with the one end of the sensing fiber,
   wherein the reflection measuring means is configured to spatially resolve measurements of a parameter along the entire length of the sensing fiber by Optical Time Domain Reflectometry (OTDR).

2. The optical fiber sensor according to claim 1 wherein said grating is uniform along said fiber length.

3. The optical fiber sensor according to claim 1 wherein said grating is chirped or step-wised along said fiber length.

4. The optical fiber sensor according to claim 1 wherein said reflection measuring means is Optical Time Domain Reflectometry.

5. A method of sensing using the optical fiber sensor of claim 1 and based on OTDR.

6. Use of an optical fiber sensor according to claim 1 for sensing temperature and/or strain along the fiber.

7. The optical fiber sensor according to claim 1 wherein the Bragg grating has less than 20% overall reflectivity.

* * * * *